(12) United States Patent
Prichard et al.

(10) Patent No.: US 10,684,013 B2
(45) Date of Patent: Jun. 16, 2020

(54) POWER GENERATION SYSTEM FOR GAS-FIRED APPLIANCES

(71) Applicant: Emerson Electric Co., St. Louis, MO (US)

(72) Inventors: James B. Prichard, Dardenne Prairie, MO (US); Mark H. Stark, St. Louis, MO (US); Soraya C. Mendoza, Frac. Cerrada Basalto (MX); Arturo U. Olague, Col. Torres del Sur (MX); Jorge D. Viesca, Cond. las Palomas (MX); John S. Haefner, Webster Groves, MO (US)

(73) Assignee: Emerson Electric Co., St. Louis, MO (US)

( * ) Notice: Subject to any disclaimer, the term of this patent is extended or adjusted under 35 U.S.C. 154(b) by 215 days.

(21) Appl. No.: 15/870,029

(22) Filed: Jan. 12, 2018

(65) Prior Publication Data

US 2018/0135857 A1 May 17, 2018

Related U.S. Application Data

(62) Division of application No. 14/266,101, filed on Apr. 30, 2014, now Pat. No. 10,151,484.

(51) Int. Cl.
*F23Q 9/14* (2006.01)
*F24H 9/20* (2006.01)
(Continued)

(52) U.S. Cl.
CPC ............ *F23Q 9/14* (2013.01); *B23P 19/04* (2013.01); *F23D 14/26* (2013.01); *F24C 3/10* (2013.01);
(Continued)

(58) Field of Classification Search
CPC . F23D 23/00; F24H 9/06; F24H 1/186; F24C 3/10
(Continued)

(56) References Cited

U.S. PATENT DOCUMENTS 2,501,850 A   3/1950 Kunzler
2,610,984 A * 9/1952 Victor ................. F23Q 9/04
                                              136/217

(Continued)

FOREIGN PATENT DOCUMENTS

DE   102009049621 A1   4/2011
EP       1188989 A2    3/2002

*Primary Examiner* — Edelmira Bosques
*Assistant Examiner* — Nikhil P Mashruwala
(74) *Attorney, Agent, or Firm* — Armstrong Teasdale LLP

(57) ABSTRACT

A power generation system for use with a gas fired appliance including a main burner and a gas supply line includes a pilot burner assembly for igniting gas supplied to the main burner and a controller. The pilot burner assembly includes a thermo-electric device configured to convert thermal energy into electrical energy, and a pilot guard. The pilot guard has a first end defining a gas inlet and a second end defining a gas outlet. The controller is configured to receive a signal from the thermo-electric device, and control the supply of gas to the main burner based on the signal. The controller is powered by electrical energy generated by the thermo-electric device. The thermo-electric device has an internal resistance matched to a load resistance of the controller to facilitate maximum power transfer between the thermo-electric device and the controller.

15 Claims, 10 Drawing Sheets

(51) Int. Cl.
  F24C 3/10 (2006.01)
  F23D 14/26 (2006.01)
  B23P 19/04 (2006.01)
  F24H 1/18 (2006.01)
(52) U.S. Cl.
  CPC ........... F24H 1/186 (2013.01); F24H 9/2021 (2013.01); F24H 9/2035 (2013.01); F23M 2900/13003 (2013.01); Y10T 29/4935 (2015.01)
(58) Field of Classification Search
  USPC ............ 431/43, 47, 258, 264, 278; 136/217
  See application file for complete search history.

(56) References Cited

U.S. PATENT DOCUMENTS

| | | | |
|---|---|---|---|
| 2,753,930 A * | 7/1956 | Fleury | F23Q 9/04 |
| | | | 431/80 |
| 2,763,705 A * | 9/1956 | Kile | F23Q 9/04 |
| | | | 136/217 |
| 2,920,126 A * | 1/1960 | Hajny | F23Q 9/04 |
| | | | 136/217 |
| 2,959,218 A * | 11/1960 | Hajny | F23Q 9/04 |
| | | | 431/278 |
| 2,965,166 A | 12/1960 | Alger | |
| 3,122,195 A * | 2/1964 | Kimmel | F23Q 9/04 |
| | | | 431/80 |
| 3,391,982 A | 7/1968 | Ward | |
| 3,511,588 A * | 5/1970 | Genbauffe | F23Q 3/002 |
| | | | 431/264 |
| 3,522,107 A * | 7/1970 | Kenyon | G01K 1/14 |
| | | | 136/217 |
| 3,615,872 A | 10/1971 | Braucksiek | |
| 3,650,843 A | 3/1972 | Kenyon | |
| 3,709,740 A | 1/1973 | Kenyon | |
| 3,754,854 A * | 8/1973 | Reutter | F23Q 9/04 |
| | | | 431/343 |
| 3,859,034 A | 1/1975 | Heyde et al. | |
| 3,930,891 A | 1/1976 | Fox et al. | |
| 3,930,892 A | 1/1976 | Fox et al. | |
| 4,021,268 A | 5/1977 | Smith | |
| 4,177,034 A * | 12/1979 | Jones | F23Q 9/04 |
| | | | 136/230 |
| 4,337,029 A * | 6/1982 | McElroy | F23Q 9/04 |
| | | | 174/153 G |
| 4,421,942 A | 12/1983 | Crichton | |
| 4,431,240 A | 2/1984 | Riehl | |
| 4,626,196 A | 12/1986 | Stohrer, Jr. | |
| 5,460,515 A | 10/1995 | Harbeck et al. | |
| 6,027,335 A * | 2/2000 | Griffioen | F23Q 9/04 |
| | | | 431/266 |
| 6,808,389 B1 | 10/2004 | Glidden | |
| 6,959,876 B2 * | 11/2005 | Chian | F24H 9/2035 |
| | | | 236/68 D |
| 8,512,034 B2 | 8/2013 | Young et al. | |
| 8,636,503 B2 | 1/2014 | Kasprzyk et al. | |
| 9,618,205 B2 * | 4/2017 | Blessing | F24H 9/2021 |
| 9,945,583 B2 * | 4/2018 | Prichard | F24H 9/2035 |
| 2006/0199124 A1 | 9/2006 | Lyles | |
| 2007/0272228 A1 * | 11/2007 | Slaby | F23D 14/045 |
| | | | 126/104 A |
| 2010/0015560 A1 * | 1/2010 | Kasprzyk | F23Q 9/04 |
| | | | 431/278 |
| 2011/0023929 A1 | 2/2011 | Edwards | |
| 2011/0045423 A1 * | 2/2011 | Young | F23Q 9/04 |
| | | | 431/258 |
| 2011/0265779 A1 * | 11/2011 | Vandrak | F24H 9/2085 |
| | | | 126/93 |
| 2012/0060819 A1 * | 3/2012 | Hunt | A47J 36/2477 |
| | | | 126/1 R |
| 2012/0215517 A1 | 8/2012 | Bohlen et al. | |
| 2012/0276488 A1 * | 11/2012 | Virag | F23Q 9/04 |
| | | | 431/278 |
| 2013/0337389 A1 * | 12/2013 | Kasprzyk | F23D 14/46 |
| | | | 431/154 |
| 2014/0272742 A1 * | 9/2014 | Vasquez-Del-Mercado | F23D 14/46 |
| | | | 431/281 |
| 2015/0330632 A1 * | 11/2015 | Blessing | F24H 9/205 |
| | | | 431/281 |

* cited by examiner

POWER GENERATION SYSTEM FOR GAS-FIRED APPLIANCES

CROSS-REFERENCE TO RELATED APPLICATIONS

This application is a divisional of U.S. patent application Ser. No. 14/266,101, filed Apr. 30, 2014, the disclosure of which is hereby incorporated by reference in its entirety.

FIELD

The field of the disclosure relates generally to gas-fired appliances, and more particularly, to pilot burner assemblies for use in millivolt controlled gas fired appliances.

BACKGROUND

Gas fired appliances, such as residential gas-fired water heaters, often include a main gas burner to provide heat for the appliance and a pilot burner assembly that provides a standing pilot flame to ignite the main gas burner (e.g., for the first time or if the main burner flame goes out). In the case of water heaters, a main gas burner is used to heat water within a water tank of the water heater. A thermostat is typically provided to control the temperature of the water inside the tank and typically may be set within a particular range (e.g., warm, hot or very hot). A pilot burner assembly provides a standing pilot flame to ignite the main gas burner. Further, water heaters typically include a thermocouple device to detect whether the pilot flame is present. The thermocouple device is typically electrically connected to a gas valve which supplies gas to the main burner of the water heater. The heat generated by the pilot flame creates an electrical current or signal in the thermocouple that keeps the gas valve open. When the pilot flame goes out, no current or signal is generated by the thermocouple, causing the gas valve to close.

Pilot burner assemblies typically include a burner tube assembly through which gas is fed and an igniter to ignite the gas supplied through the burner tube assembly. Known burner tube assemblies typically have several discrete components used to connect the burner tube assembly to a gas supply line, and to mount the pilot burner assembly within the water heater system. Further, such components often require precise connecting procedures, such as staking or tightening according to a torque specification. Assembly of such pilot burner assemblies is thus timely and complicated.

Additionally, at least some pilot burner assemblies include a pilot hood as a separate component from the burner tube assembly, further increasing the material cost and time needed to assemble such pilot burner assemblies. Moreover, the spark gap between the igniter and an igniting component (e.g., the pilot hood) in such pilot burner assemblies often requires adjustment following assembly of the pilot burner assembly to ensure proper operation. In some pilot burner assemblies, the proper spark gap is obtained by bending the igniter toward or away from the igniting component, such as the pilot hood, until the proper spark gap is obtained. While such bending may provide the desired spark gap, it is often difficult, time-consuming, and costly. Further, the igniter and the ignition component are susceptible to rotation, bending, and other movement during subsequent handling of the burner assembly, which may alter the size of the spark gap. Further, the resulting spark gap between the igniter and the igniting component is often unreliable as the arc path may not consistently intersect the air-fuel mixture discharged from the burner tube.

Moreover, thermocouples used in known pilot burner assemblies are not optimized for the systems in which they are used, thus resulting in power efficiency losses.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a pilot burner assembly for use with a gas fired appliance is provided. The pilot burner assembly includes a bracket, a thermo-electric device configured to be connected to the bracket, and a unitary pilot guard. The bracket includes a first plate and a second plate spaced from the first plate. Each of the first and second plates have a pilot guard aperture defined therein. The pilot guard has a first end defining a gas inlet configured to receive a gas supply line, and a second end defining a gas outlet. The pilot guard includes an elongate body and a pilot hood disposed at the second end, and is configured be inserted into the pilot guard apertures. The pilot guard further includes a first retention element configured to cooperate with a second retention element on the gas supply line to maintain a connection between the pilot guard and the gas supply line.

In another aspect, a power generation system for use with a gas fired appliance including a main burner and a gas supply line is provided. The power generation system includes a pilot burner assembly for igniting gas supplied to the main burner and a controller. The pilot burner assembly includes a thermo-electric device configured to convert thermal energy into electrical energy, and a pilot guard. The pilot guard has a first end defining a gas inlet and a second end defining a gas outlet. The pilot guard includes an elongate body and a pilot hood disposed at the second end. The controller is configured to receive a signal from the thermo-electric device, and control the supply of gas to the main burner based on the signal. The controller is powered by electrical energy generated by the thermo-electric device. The thermo-electric device has an internal resistance matched to a load resistance of the controller to facilitate maximum power transfer between the thermo-electric device and the controller.

In yet another aspect, a method of assembling a pilot burner assembly for use with a gas fired appliance including a main burner and a gas supply line including an outlet orifice is provided. The pilot burner assembly includes a bracket, a thermo-electric device, and a pilot guard. The bracket includes a first plate and a second plate, each having a pilot guard aperture defined therein. The pilot guard has a first end defining a gas inlet and a second end defining a gas outlet, and includes an elongate body and a pilot hood disposed at the second end. The pilot guard further includes a first retention element, and the gas supply line further includes a second retention element. The method includes inserting the outlet orifice through at least one of the pilot guard apertures defined in the first plate and the second plate, and inserting the pilot guard through each pilot guard aperture such that the first retention element engages the second retention element to maintain a connection between the pilot guard and the gas supply line.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

DETAILED DESCRIPTION

Figure 1:
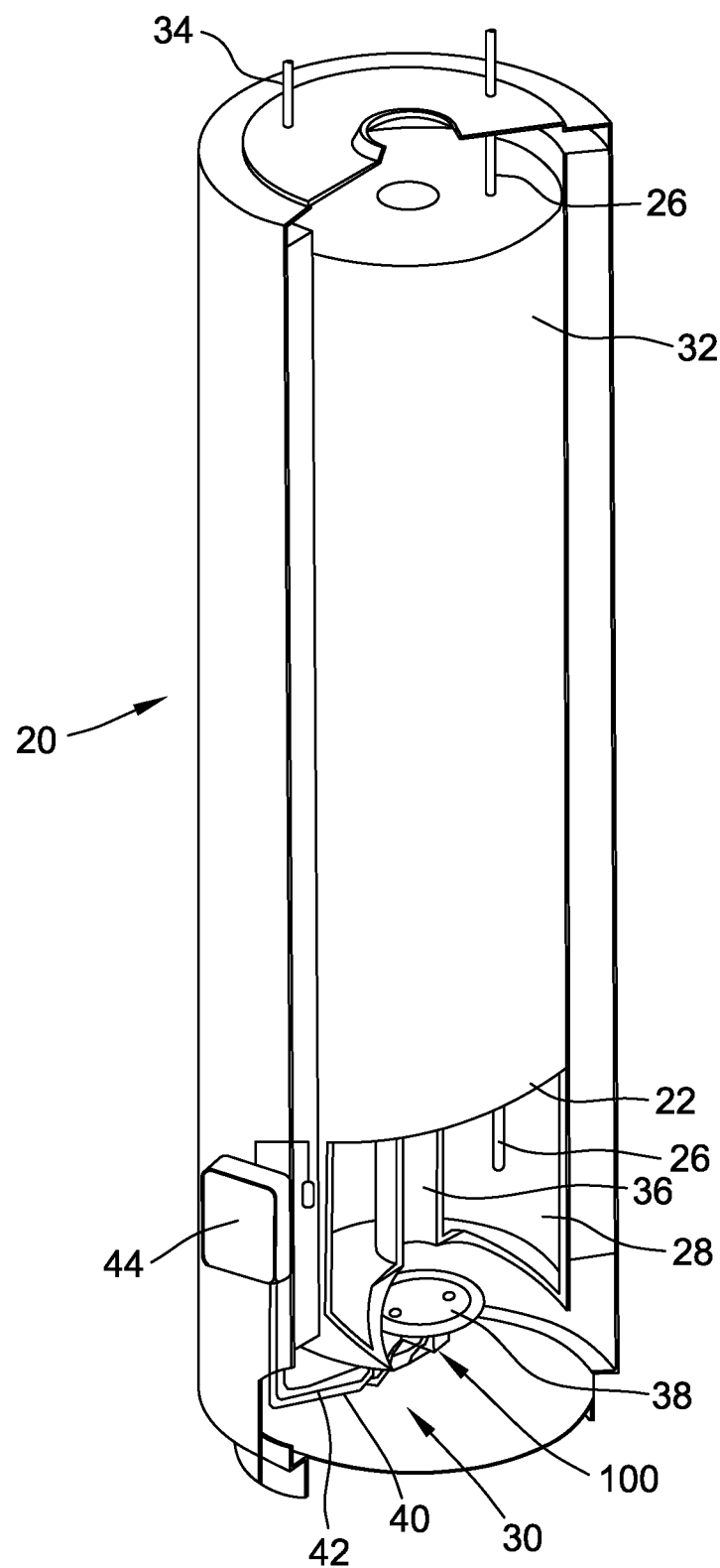
FIG. 1 is a cut-away view of a gas fired appliance shown in the form of a water heater system, the water heater system including a main burner and one embodiment of a pilot burner assembly for igniting the main burner.

Referring to FIG. 1, a gas fired appliance illustrated in the form of a water heater system for heating and storing water is indicated generally at 20. Water heater system 20 generally includes a storage tank 22 and a gas-fired burner assembly 30 positioned beneath storage tank 22 for heating water supplied to and stored in storage tank 22. Storage tank 22 receives cold water via a cold water inlet 26 in a bottom portion 28 of storage tank 22. Cold water entering bottom portion 28 of storage tank 22 is heated by burner assembly 30. Water that is heated leaves storage tank 22 via a hot water outlet pipe 34. Combustion gases from burner assembly 30 leave water heater system 20 via a flue 36.

Burner assembly 30 includes a main burner 38 connected to a gas supply via a gas supply line 40, a controller 44 for controlling the supply of gas to main burner 38, and a pilot burner assembly 100 for igniting main burner 38. As described in more detail herein, pilot burner assembly 100 is also configured to detect whether a pilot flame is present or extinguished, and communicate with controller 44 via connection 42 to control the supply of gas to main burner 38 (e.g., by shutting off the supply of gas if no pilot flame is detected).

Figure 2:
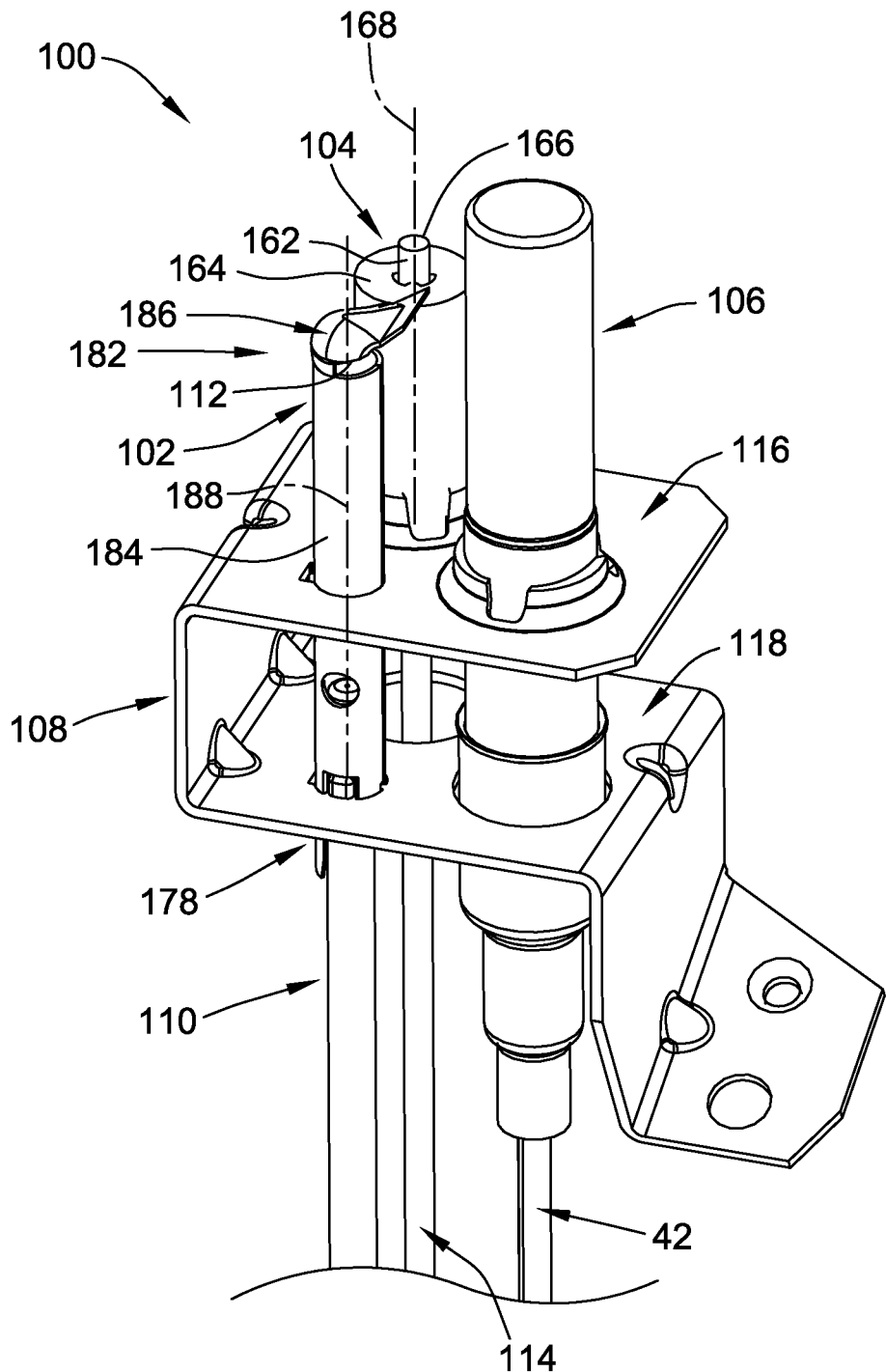
FIG. 2 is a perspective view of the pilot burner assembly shown in FIG. 1 in an assembled configuration.
Figure 3:
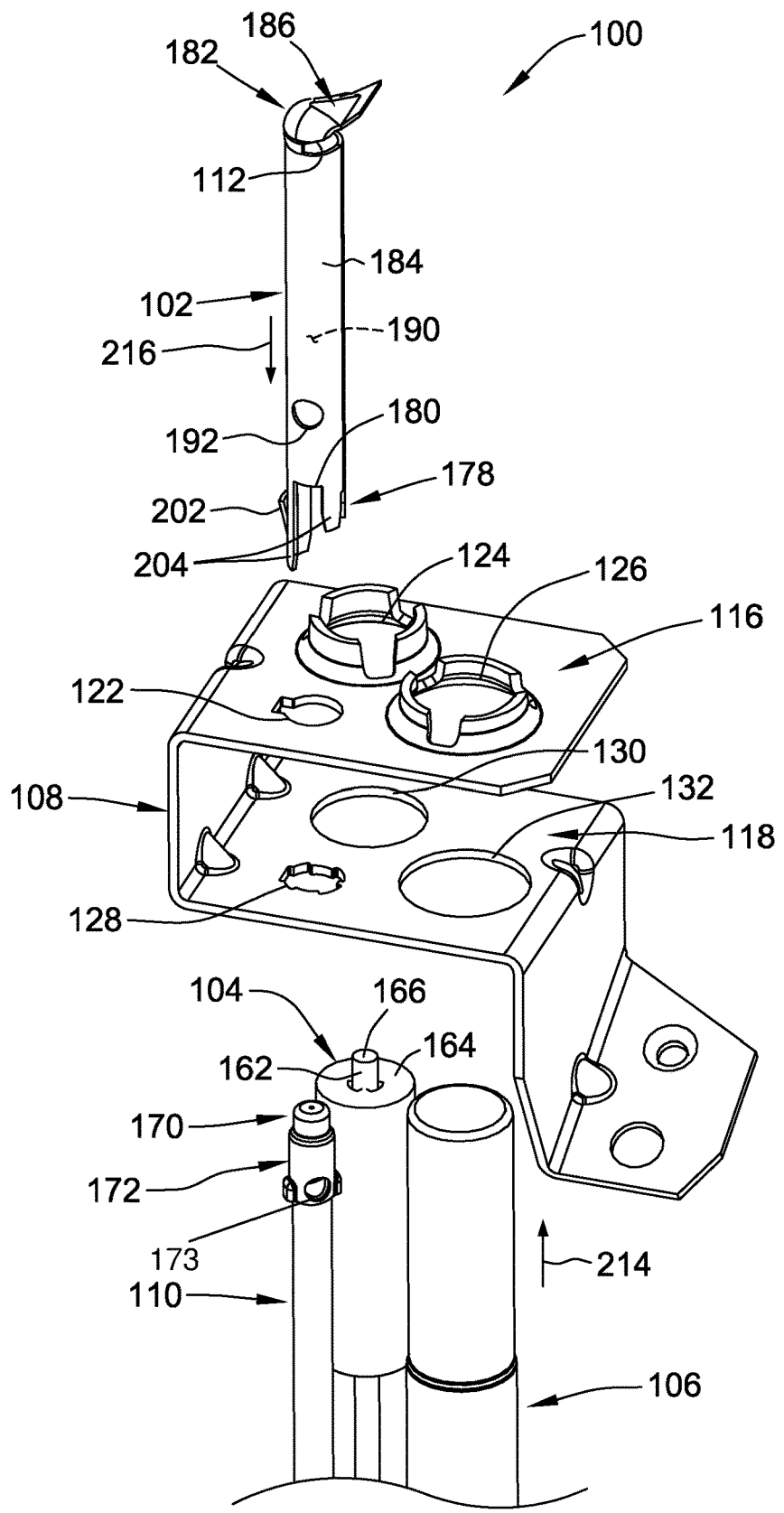
FIG. 3 is an exploded view of the pilot burner assembly shown in FIG. 2.

Referring to FIGS. 2 and 3, the pilot burner assembly 100 includes a pilot guard 102, an igniter 104, a thermo-electric device 106, and a mounting bracket 108. The illustrated pilot burner assembly 100 also includes a gas supply line 110 that facilitates quick and easy assembly of pilot burner assembly 100, as described in more detail herein.

Gas is supplied to pilot guard 102 via gas supply line 110, and is mixed with air within pilot guard 102 before being discharged at a gas outlet 112 of pilot guard 102. Igniter 104 is connected to a voltage source (not shown) via connection line 114 which provides sufficient electrical energy to create an electrical arc or spark between igniter 104 and pilot guard 102 and ignite the air-fuel mixture. The ignition of the air-fuel fuel mixture creates a flame, also referred to herein as a pilot flame or a pilot light, which is directed towards the thermo-electric device 106 by pilot guard 102. Thermo-electric device 106 converts thermal energy from the pilot flame into an electric current or signal, and outputs the current or signal to controller 44 (shown in FIG. 1) via connection 42. Pilot guard 102, igniter 104, and thermo-electric device 106 are each connected to mounting bracket 108, which maintains the position of pilot guard 102, igniter 104, and thermo-electric device 106 relative to one another. Mounting bracket 108 is mounted to water heater system 20 to maintain the position of pilot guard 102, igniter 104, and thermo-electric device 106 relative to other components of water heater system 20, such as main burner 38. As described in more detail herein, the components of pilot burner assembly 100 include various retention elements that enable relatively quick and simple assembly of pilot burner assembly 100 as compared to conventional systems.

Figure 4:
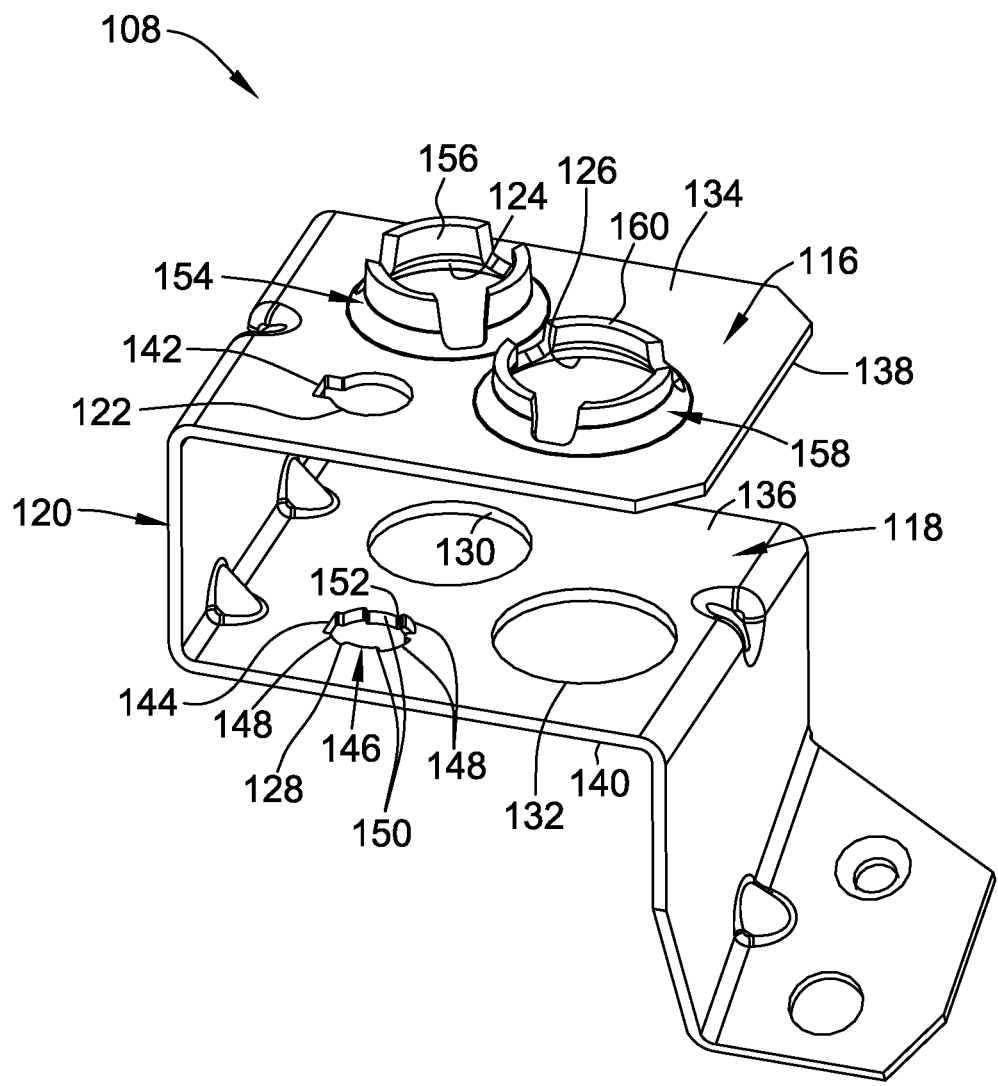
FIG. 4 is a perspective view of a mounting bracket included in the pilot burner assembly shown in FIG. 2.

With additional reference to FIG. 4, mounting bracket 108 includes a first plate 116, a second plate 118 spaced from first plate 116, and a third plate 120 interconnecting first plate 116 and second plate 118. First plate 116 includes a pilot guard aperture 122 (broadly, a first aperture) configured to receive pilot guard 102 therein, an igniter aperture 124 (broadly, a second aperture) configured to receive igniter 104 therein, and a thermo-electric device aperture 126 (broadly, a third aperture) configured to receive thermo-electric device 106 therein. Second plate 118 similarly includes a pilot guard aperture 128 configured to receive pilot guard 102 therein, an igniter aperture 130 configured to receive igniter 104 therein, and a thermo-electric device aperture 132 configured to receive thermo-electric device 106 therein. Further, first plate 116 and second plate 118 each include a respective first side 134, 136, and an opposing second side 138, 140.

In the illustrated embodiment, first plate 116 and second plate 118 are oriented substantially parallel to one another, and third plate is oriented substantially perpendicular to first plate 116 and second plate 118. In other suitable embodiments, first plate 116 and second plate 118 may be oriented other than substantially parallel to one another, and third plate 120 may be oriented other than substantially perpendicular to first plate 116 and second plate 118.

Pilot guard aperture 122 defined in first plate 116 is sized and shaped to receive pilot guard 102 therein. More specifically, the diameter of pilot guard aperture 122 is substantially equal to an outer diameter of pilot guard 102. Pilot guard aperture 122 also includes a slotted region 142 that enables one or more retention elements of pilot guard 102 to pass therethrough when pilot burner assembly 100 is assembled.

Pilot guard aperture 128 defined in second plate 118 is sized and shaped to receive pilot guard 102 therein. More specifically, the diameter of pilot guard aperture 128 is substantially equal to an outer diameter of pilot guard 102. Pilot guard aperture 128 also includes a slotted region 144 that enables one or more retention elements of pilot guard 102 to pass therethrough when pilot burner assembly 100 is assembled. Further, second plate 118 includes a retaining ledge 146 that extends into pilot guard aperture 128 and at least partially defines slots 148 along the outer perimeter of pilot guard aperture 128. As described in more detail herein, retaining ledge 146 and slots 148 cooperate with one or more retention elements of pilot guard 102 and gas supply line 110 to enable relatively quick and simple assembly of pilot burner assembly 100. In the illustrated embodiment, retaining ledge 146 includes two retaining protrusions 150 spaced circumferentially around pilot guard aperture 128. Further, in the illustrated embodiment, retaining protrusions 150 protrude into pilot guard aperture 128 from diametrically opposed sides of pilot guard aperture 128. In other suitable embodiments, retaining ledge 146 may include any suitable number of retaining protrusions, such as one, three, and four protrusions, arranged in any suitable configuration that enables pilot burner assembly 100 to function as described herein.

Second plate 118 also includes a locking protrusion 152 that protrudes into pilot guard aperture 128. Locking protrusion 152 is spaced circumferentially from retaining protrusions 150 around pilot guard aperture 128. As described in more detail herein, locking protrusion 152 is configured to cooperate with a retention element on pilot guard 102 to inhibit rotation of pilot guard 102 relative to bracket 108 when pilot burner assembly 100 is assembled. The illustrated embodiment includes one locking protrusion 152, although other suitable embodiments may include more than one locking protrusion, such as two, three, four, or any other suitable number of locking protrusions.

Each retaining protrusion 150 and locking protrusion 152 extends a distance along the perimeter of pilot guard aperture 128 (i.e., in a circumferential direction), referred to as the width of the respective protrusion. As shown in FIG. 4, retaining protrusions 150 have a greater width than locking protrusion 152.

As noted above, slots 148 are provided along the outer perimeter of pilot guard aperture 128. Slots 148 are defined by retaining protrusions 150 and/or locking protrusion 152, and are configured (i.e., sized and shaped) to receive and/or retain retention elements on gas supply line 110 and pilot guard 102, as described in more detail herein. The illustrated embodiment includes three slots 148. Further, in the illustrated embodiment, one slot 148 is defined by two retaining protrusions 150, and two slots 148 are defined by one retaining protrusion 150 and locking protrusion 152. In other suitable embodiments, pilot burner assembly 100 may include any suitable number of slots 148 arranged in any suitable configuration that enables pilot burner assembly 100 to function as described herein. As described in more detail herein, the configuration of pilot guard aperture 128, retaining ledge 146, slots 148, retaining protrusion 150 and locking protrusion 152 facilitates maintaining the orientation of pilot guard 102 relative to igniter 104 and thermo-electric device 106.

Each igniter aperture 124, 130 is sized and shaped to receive igniter 104 therein. More specifically, each igniter aperture 124, 130 has a diameter substantially equal to an outer diameter of igniter 104. In the illustrated embodiment, first plate 116 includes a retaining ring 154 surrounding igniter aperture 124. Retaining ring 154 is configured to provide a connection between mounting bracket 108 and igniter 104. In the illustrated embodiment, for example, retaining ring 154 includes resilient fingers 156 extending towards the center of igniter aperture 124. In the illustrated embodiment, retaining ring 154 includes three resilient fingers 156, although retaining ring 154 may include less than or more than three resilient fingers 156. In one suitable embodiment, for example, retaining ring 154 includes a single, continuous, resilient finger forming a solid, resilient ring surrounding igniter aperture 124.

Each resilient finger 156 is biased towards the center of igniter aperture 124 such that when igniter 104 is inserted through igniter aperture 124, resilient fingers 156 provide a press-fit connection between mounting bracket 108 and igniter 104. In the illustrated embodiment, resilient fingers 156 extend from first side 134 of first plate 116 and away from second plate 118. In other suitable embodiments, resilient fingers 156 may extend from second side 138 of first plate 116 and towards second plate 118.

Each thermo-electric device aperture 126, 132 is sized and shaped to receive thermo-electric device 106 therein. More specifically, each thermo-electric device aperture 126, 132 has a diameter substantially equal to an outer diameter of thermo-electric device 106. In the illustrated embodiment, first plate 116 includes a retaining ring 158 surrounding thermo-electric device aperture 126. Retaining ring 158 is configured to provide a connection between mounting bracket 108 and thermo-electric device 106. In the illustrated embodiment, for example, retaining ring 158 includes resilient fingers 160 extending towards the center of thermo-electric device aperture 126. In the illustrated embodiment, retaining ring 158 includes three resilient fingers 160, although it is understood that retaining ring 158 may include less than or more than three resilient fingers 160. In one suitable embodiment, for example, retaining ring 158 includes a single, continuous, resilient finger forming a solid, resilient ring surrounding thermo-electric device aperture 126.

Each resilient finger 160 is biased towards the center of thermo-electric device aperture 126 such that when thermo-electric device 106 is inserted through thermo-electric device aperture 126, resilient fingers 160 provide a press-fit connection between mounting bracket 108 and thermo-electric device 106. In the illustrated embodiment, resilient fingers 160 extend from first side 134 of first plate 116 and away from second plate 118. In other suitable embodiments, resilient fingers 160 may extend from second side 138 of first plate 116 and towards second plate 118.

Referring again to FIGS. 2 and 3, thermo-electric device 106 is configured to detect the presence of a pilot flame by converting thermal energy from the pilot flame into an electric current or signal, and outputting the current or signal to controller 44 (shown in FIG. 1) via connection 42. In the absence of a current or signal from thermo-electric device (e.g., when pilot flame is extinguished), controller 44 is configured to shut off the supply of gas to main burner 38. When pilot burner assembly 100 is assembled (shown in FIG. 2), thermo-electric device 106 is received within thermo-electric device apertures 126, 132 (shown in FIG. 3) in mounting bracket 108, and connected to mounting bracket 108 by a press-fit connection between retaining ring 158 (shown in FIG. 4) and thermo-electric device 106.

Thermo-electric device 106 may be any suitable thermo-electric device 106 that enables pilot burner assembly 100 to function as described herein including, for example, a thermocouple or a thermopile (i.e., a plurality of thermocouples connected in series or parallel). In the illustrated embodiment, thermo-electric device 106 is a thermopile, and, more specifically, a millivolt thermopile.

Further, in the illustrated embodiment, thermo-electric device 106 is used as a power supply for controller 44 (shown in FIG. 1). That is, thermo-electric device 106 acts as a thermogenerator (also known as a thermoelectric generator), converting thermal energy from the pilot flame into electrical energy to power controller 44. Accordingly, pilot burner assembly 100 and controller 44 are collectively referred to herein as a power generation system.

Thermo-electric device 106 is configured to maximize power transfer between thermo-electric device 106 and controller 44 (shown in FIG. 1). More specifically, thermo-electric device 106 has an internal resistance that is matched to (e.g., substantially equal to) a load resistance, or impedance, of controller 44. In some embodiments, the load resistance of controller 44 may vary depending upon an operational state of controller 44. For example, controller 44 may have a first load resistance during a charging state (broadly, a first state) in which capacitors within controller 44 are charged, and a second load resistance during a standby state (broadly, a second state). The load resistance of controller 44 in the charging state may be higher or lower than the load resistance in the standby state. Further, the power consumption of controller 44 may be different depending upon the operational state of controller 44. For example, the power consumption of controller 44 may be higher during the charging state, and lower during the standby state. Accordingly, the internal resistance of thermo-electric device 106 may be matched to a load resistance of controller 44 to facilitate maximum power transfer between thermo-electric device 106 and controller 44. In one suitable embodiment, for example, the internal resistance of thermo-electric device 106 is substantially equal to the load resistance of controller 44 corresponding to the maximum power consumption operational state of controller 44 (e.g., a charging state). In another suitable embodiment, the internal resistance of thermo-electric device 106 is between a first load resistance of controller 44 corresponding to a first operational state (e.g., a charging state) and a second load resistance of controller 44 corresponding to a second operational state (e.g., a standby state). The value of the internal resistance of thermo-electric device 106 may vary depending on the type of controller used for controller 44. In one suitable embodiment, the internal resistance of thermo-electric device is between about 2 Ohms ($\Omega$) and about 9$\Omega$, more suitably between about 4$\Omega$ and about 8$\Omega$ and, even more suitably, between about 4.5$\Omega$ and about 5.5$\Omega$.

Still referring to FIGS. 2 and 3, igniter 104 is configured to provide an ignition source to ignite the air-fuel mixture fed through gas outlet 112. When pilot burner assembly 100 is assembled (shown in FIG. 2), igniter 104 is received in igniter apertures 124, 130 (shown in FIG. 3) in mounting bracket 108, and connected to mounting bracket 108 by a press-fit connection between retaining ring 154 (shown in FIG. 4) and igniter 104.

Igniter 104 may be any suitable igniter 104 that enables pilot burner assembly 100 to function as described herein, including, for example a piezo-electric igniter. In the illustrated embodiment, igniter 104 includes an electrode 162 surrounded by an insulating sleeve 164 to provide insulation between electrode 162 and mounting bracket 108. Electrode 162 includes an electrode tip 166 that protrudes out of one end of insulating sleeve 164. Electrode tip 166 is positioned a sufficient distance from mounting bracket 108 (specifically, first plate 116 of mounting bracket 108) to prevent an electrical arc or spark between electrode tip 166 and mounting bracket 108 through the open air or by over-surface ignition along the surface of the insulating sleeve 164. Igniter 104 (more specifically, insulating sleeve 164) may have a constant diameter as shown in FIGS. 2 and 3, or igniter 104 may be outwardly tapered along a longitudinal axis 168 of igniter 104 to reduce the press-fit distance of igniter 104 within mounting bracket 108.

Gas supply line 110 is configured to supply gas to pilot guard 102. When pilot burner assembly 100 is assembled, gas supply line 110 is fluidly connected to a gas source (not shown) at one end (i.e., an inlet end), and fluidly connected to pilot guard 102 at an outlet end 170 (shown in FIG. 3) of gas supply line 110. As shown in FIG. 3, gas supply line 110 includes an outlet orifice 172 disposed at outlet end 170 configured to be connected to mounting bracket 108 and pilot guard 102. Outlet orifice 172 may be connected to gas supply line 110 by any suitable connection that enables gas supply line 110 to function as described herein. In the illustrated embodiment, for example, outlet orifice 172 is press-fit onto the outer diameter outlet end 170 of gas supply line 110 and staked to gas supply line 110 (indicated by an indented region 173 on outlet orifice 172 in FIG. 3). Outlet orifice 172 may also be press-fit to the inner diameter of outlet end 170. Additionally or alternatively, outlet orifice 172 may be welded to outlet end 170 of gas supply line 110.

Figure 5:
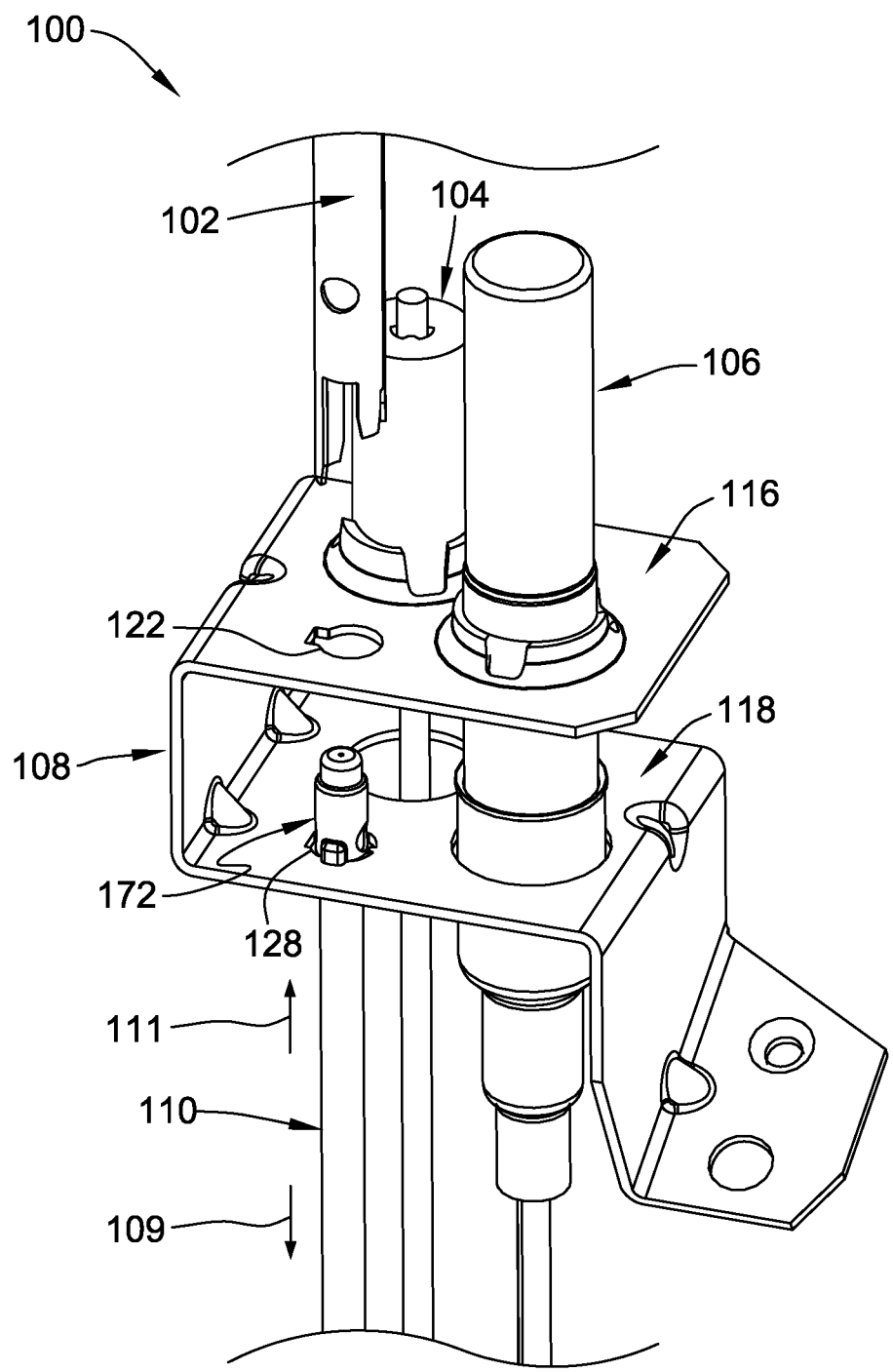
FIG. 5 is a perspective view of the pilot burner assembly shown in FIG. 2 in a partially assembled configuration.
Figure 6:
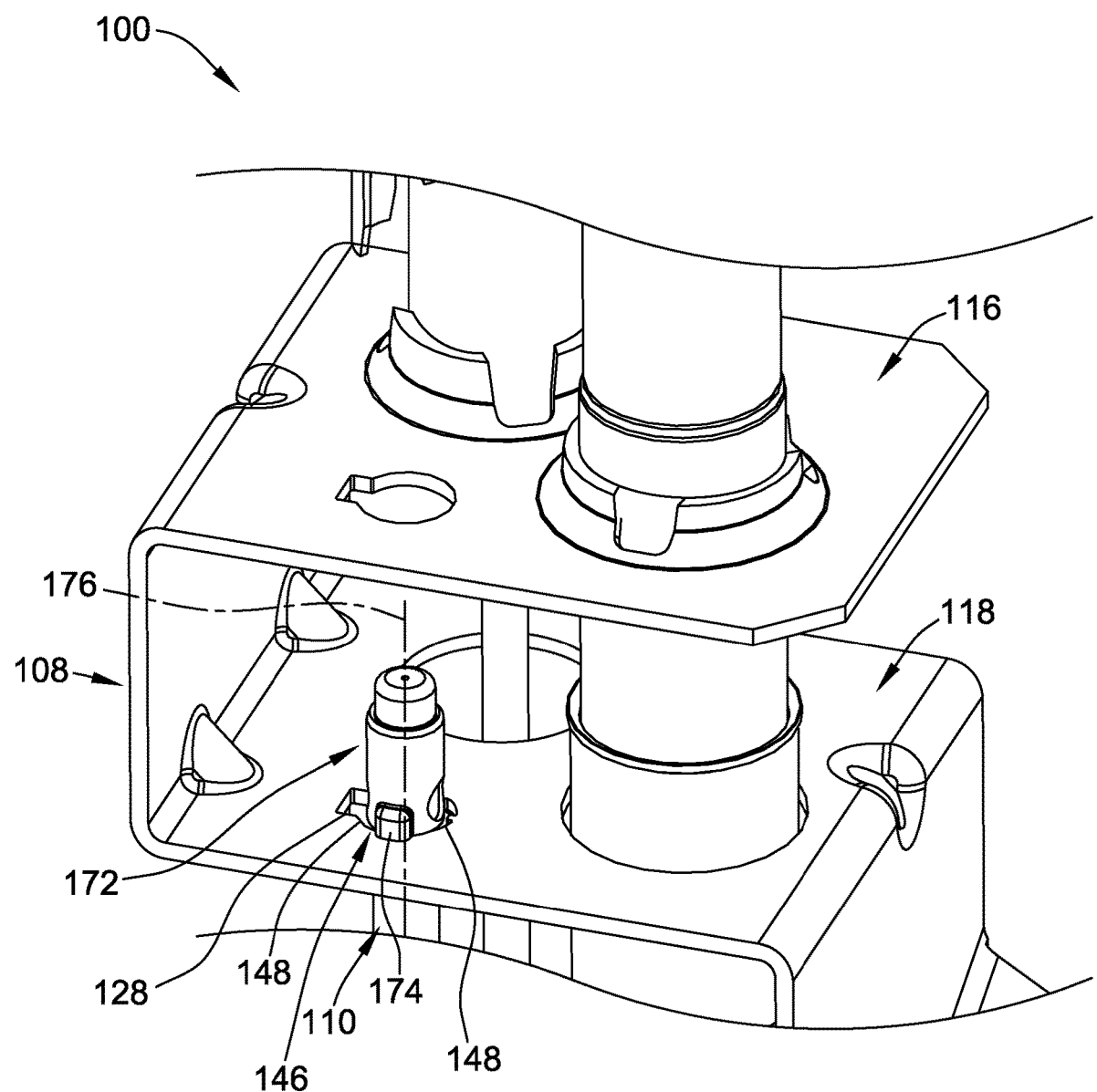
FIG. 6 is an enlarged perspective view of the pilot burner assembly shown in FIG. 5.

With additional reference to FIGS. 5 and 6, outlet orifice 172 is received through pilot guard aperture 128, and is connected to mounting bracket 108 by retaining ledge 146 (shown in FIG. 4). Outlet orifice 172 includes a plurality of retainers 174 (shown in FIG. 6) extending radially outward from outlet orifice 172. Retainers 174 are configured (i.e., sized and shaped) to be received through slots 148 (shown in FIG. 4) in second plate 118 and engage retaining ledge 146 (specifically, retaining protrusions 150, shown in FIG. 4) to inhibit axial movement of gas supply line 110 in a first direction, indicated by arrow 109 in FIG. 5. Retainers 174 are also configured to cooperate with retention elements on pilot guard 102 to inhibit rotation of outlet orifice 172 and inhibit axial movement of gas supply line 110 in a second direction, indicated by arrow 111 in FIG. 5, opposite first direction 109. Retainers 174 may also be configured to be received within pilot guard aperture 122.

The configuration of mounting bracket 108 and outlet orifice 172 facilitates relatively quick and simple assembly of pilot burner assembly 100 as compared to conventional systems using, for example, threaded connecting members. Specifically, outlet orifice 172 is configured to be connected to mounting bracket 108 by inserting outlet orifice 172 through pilot guard aperture 128 (shown in FIG. 4), and rotating outlet orifice 172 by less than 180 degrees about a longitudinal axis 176 (shown in FIG. 6) of gas supply line 110. More specifically, in the illustrated embodiment, outlet orifice 172 is configured to be connected to mounting bracket 108 by rotating outlet orifice 172 by about 45 degrees. In other suitable embodiments, outlet orifice 172 may be configured to be connected to mounting bracket 108 by rotating outlet orifice 172 by less than about 90 degrees, more suitably less than about 60 degrees, and, even more suitably, by less than about 45 degrees.

Referring again to FIGS. 2 and 3, pilot guard 102 is configured to receive gas from gas supply line 110, mix the gas with air, and direct the air-fuel mixture out of pilot guard 102 and towards thermo-electric device 106. Pilot guard 102 has a first end 178 defining a gas inlet 180 (shown in FIG. 3), and an opposing second end 182 in which gas outlet 112 is defined. Further, pilot guard 102 includes an elongate tubular body 184 and a pilot hood 186 disposed at second end 182. When pilot burner assembly 100 is assembled, pilot guard 102 is connected to gas supply line 110 (specifically, outlet orifice 172) at gas inlet 180. Gas supplied to pilot guard 102 is mixed with air within body 184 of pilot guard 102. The air-fuel mixture is discharged at second end 182 through gas outlet 112. Pilot hood 186 at least partially defines gas outlet 112, and is configured to direct the air-fuel mixture towards thermo-electric device 106. Pilot hood 186 is further configured to cooperate with electrode 162 of igniter 104 to generate an electrical arc and ignite the air-fuel mixture discharged through gas outlet 112.

Pilot guard body 184 has a generally tubular shape, and extends from first end 178 of pilot guard 102 towards second end 182 along a central longitudinal axis 188 (shown in FIG. 2) of pilot guard 102. Pilot guard body 184 defines a fluid conduit 190 (shown in FIG. 3) through which gas supplied by gas supply line 110 is fed and mixed with air from the surrounding atmosphere. Pilot guard body 184 includes one or more air inlets 192 (shown in FIG. 3) defined therein to receive air from the surrounding atmosphere into fluid conduit 190. As described in more detail herein, retention elements of mounting bracket 108 are configured to cooperate with one or more retention elements of gas supply line 110 and pilot guard 102 to maintain a relative position between outlet orifice 172 and air inlet 192 such that gas flowing through pilot guard 102 (e.g., through fluid conduit 190) creates a Venturi effect within pilot guard 102 to facilitate mixing of gas and air within pilot guard 102. The illustrated embodiment includes a single air inlet 192, although pilot guard body 184 may include any suitable number of air inlets 192 that enable pilot guard 102 to function as described herein.

Pilot hood 186 extends from pilot guard body 184 at second end 182 of pilot guard 102. Pilot hood 186 at least partially defines gas outlet 112, and is shaped to define a directional fluid flow path for the air-fuel mixture discharged from pilot guard 102. When pilot burner assembly 100 is assembled, pilot hood 186 extends from pilot guard body 184 towards thermo-electric device 106 such that the air-fuel mixture discharged from pilot guard 102 is directed towards thermo-electric device 106.

Figure 7:
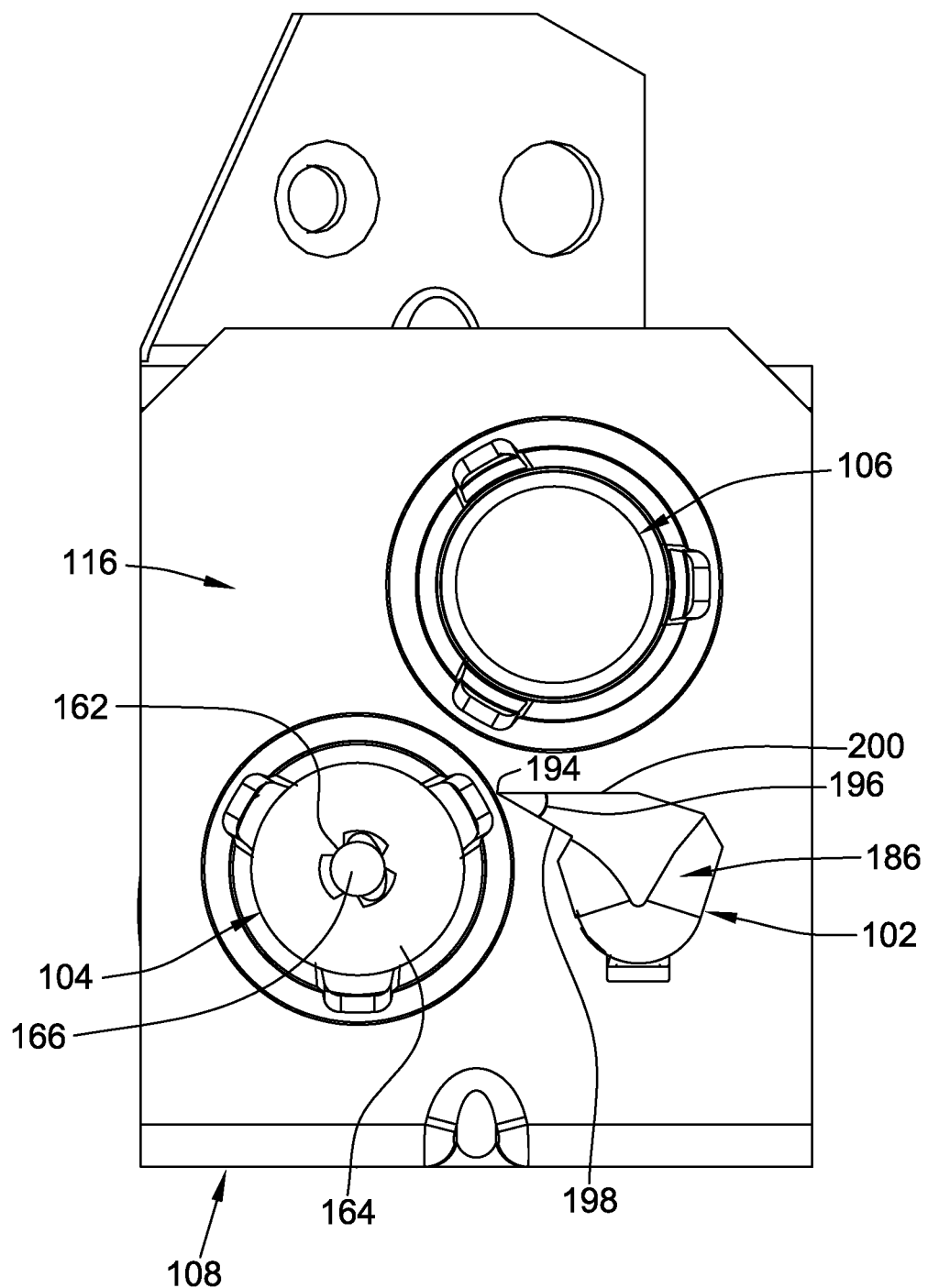
FIG. 7 is a top plan view of the pilot burner assembly shown in FIG. 2.

With additional reference to FIG. 7, pilot hood 186 includes an angled sparking tip 194. When pilot burner assembly 100 is assembled, sparking tip 194 is positioned closer to igniter 104 (specifically, electrode 162) than any other part of pilot guard 102 such that the electrical arc generated by igniter 104 is generated between electrode 162 and sparking tip 194. Further, sparking tip 194 is configured to concentrate the electric field induced by electrode 162 within pilot hood 186 at sparking tip 194. More specifically, sparking tip 194 is angled at an angle 196 defined by a first side 198 and a second side 200 of sparking tip 194. First side 198 and second 200 extend from pilot hood 186 towards igniter 104, and adjoin one another at sparking tip 194. In one suitable embodiment, angle 196 is between about 179 degrees and about 10 degrees, more suitably between about 160 degrees and about 15 degrees, and, even more suitably, between about 45 degrees and about 25 degrees. Thus, in some suitable embodiments, sparking tip 194 is acutely angled, and in other suitable embodiments, sparking tip 194 is obtusely angled. In yet other suitable embodiments, sparking tip 194 may be angled at a substantially right angle (i.e., 90 degrees).

The configuration of sparking tip 194 causes the electric field induced by igniter 104 at the surface of pilot hood 186 to be concentrated at sparking tip 194. As a result, the electrical arc generated between igniter 104 and pilot hood 186 is generated at approximately the same location on sparking tip 194 each time the arc is generated. Sparking tip 194 thereby facilitates a relatively consistent spark path between electrode 162 and pilot guard 102, and thus improves the reliability of pilot burner assembly 100 by reducing the number of ignition attempts needed to ignite the pilot flame.

Referring again to FIGS. 2 and 3, pilot guard 102 is a single, unitary piece of material. That is, pilot guard body 184 and pilot hood 186 are formed as a single piece of material. The pilot guard 102 is suitably made of, for example, stainless steel, though other materials are contemplated. The unitary construction of pilot guard 102 facilitates more efficient assembly of pilot burner assembly 100, as compared to prior systems with separate pilot guard and hood assemblies.

Pilot guard 102 is connected to mounting bracket 108 and gas supply line 110 by various retention elements that enable relatively quick and easy assembly of pilot burner assembly 100 as compared to conventional systems. Specifically, pilot guard 102 includes a depressible retention tab 202 (shown in FIG. 3) that permits pilot guard 102 to be inserted through pilot guard apertures 122, 128 in one direction, and inhibits movement of pilot guard 102 in the opposite direction. Further, pilot guard 102 includes locking fingers 204 (shown in FIG. 3) configured to be received within slots 148 (shown in FIG. 4) on mounting bracket 108 and prevent rotation of pilot guard 102 to maintain the orientation of pilot guard 102 relative to mounting bracket 108 and other components of pilot burner assembly 100 (e.g., igniter 104 and thermo-electric device 106).

Figure 8:
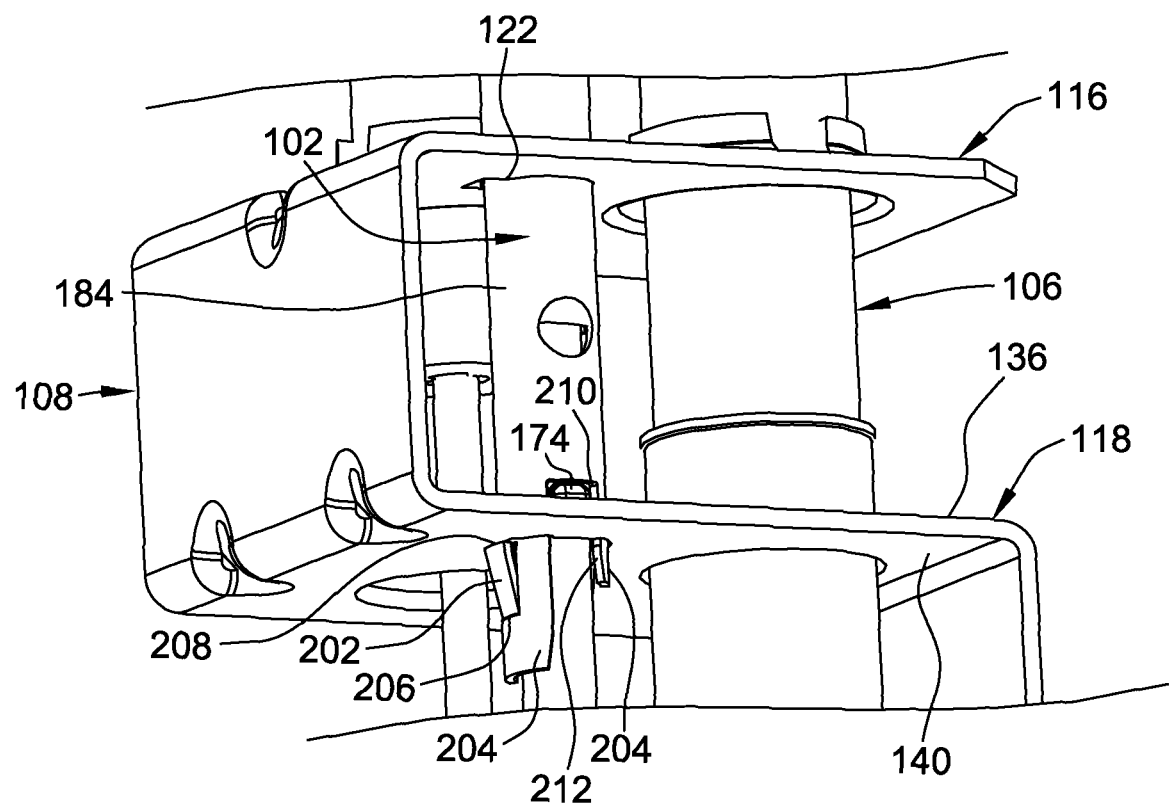
FIG. 8 is another enlarged perspective view of the pilot burner assembly shown in FIG. 2.

With additional reference to FIG. 8, retention tab 202 is connected to pilot guard body 184 at a first end 206, and extends radially outward from pilot guard body 184 to a second, free end 208. Retention tab 202 is depressible from its relaxed position (shown in FIG. 8) towards central longitudinal axis 188 of pilot guard 102 (i.e., in a radial direction) to a depressed position (not shown). Further, retention tab 202 is biased towards its relaxed position such that retention tab 202 returns to the relaxed position in the absence of a bending force (e.g., after retention tab 202 traverses one of pilot guard apertures 122 or 128). As shown in FIG. 8, the illustrated retention tab 202 extends from first end 206 towards second end 182 (shown in FIG. 2) of pilot guard 102. That is, free end 208 of retention tab 202 points towards second end 182 of pilot guard 102. Retention tab 202 is positioned proximate first end 178 (shown in FIG. 2) of pilot guard 102 such that, when pilot burner assembly 100 is assembled, retention tab 202 engages second side 140 of second plate 118 and inhibits movement of pilot guard 102 towards second end 182 of pilot guard 102. Retention tab 202 is thus configured to permit pilot guard 102 to be inserted through pilot guard apertures 122, 128 first end 178 first, and to inhibit axial movement of pilot guard 102 in the opposite direction (i.e., towards second end 182 of pilot guard 102).

In other suitable embodiments, retention tab 202 may extend from first end 206 of retention tab 202 towards first end 178 of pilot guard 102. That is, free end 208 of retention tab 202 may point towards first end 178 of pilot guard 102. In such embodiments, retention tab 202 may be configured to engage first side 136 of second plate 118 when pilot burner assembly 100 is assembled. In yet other suitable embodiments, pilot guard 102 may include a retention tab positioned approximately centrally along longitudinal axis 188 of pilot guard 102 such that the retention tab engages one of first side 134 or second side 138 of first plate 116 (shown in FIG. 4) when pilot burner assembly 100 is assembled. Further, although pilot guard 102 is illustrated with a single retention tab 202, pilot guard 102 may include more than one retention tab, such as two, three, four, or any other suitable number of retention tabs in accordance with any of the above described retention tabs.

The illustrated retention tab 202 is formed by stamping retention tab 202 out of pilot guard body 184. That is, retention tab 202 is a stamp-formed retention tab. In other suitable embodiments, retention tab 202 may be formed using any suitable technique that enables pilot guard 102 to function as described herein.

Locking fingers 204 extend from a bottom edge 210 of pilot guard body 184, and define slots 212 extending along longitudinal axis 188 of pilot guard 102. Locking fingers 204 are sized and shaped to be received within slots 148 defined by retaining protrusions 150 and locking protrusion 152 (all shown in FIG. 4). Slots 212 defined by locking fingers 204 are configured to receive at least one of retainers 174 of outlet orifice 172, retaining protrusions 150, and locking protrusion 152 therein. In the illustrated embodiment, only one of slots 212 is configured to receive locking protrusion 152 therein. Thus, pilot guard 102 can be inserted into pilot guard aperture 128 (shown in FIG. 3) in only one orientation (e.g., the orientation in which sparking tip 194 extends towards igniter 104 and in which pilot hood 186 directs the pilot flame towards thermo-electric device 106). In other words, locking protrusion 152 and locking fingers 204 (specifically, slots 212 defined by locking fingers 204) facilitate assembly of pilot burner assembly 100 by preventing insertion of pilot guard 102 in an incorrect orientation (e.g., an orientation in which sparking tip 194 extends in a direction other than towards igniter 104 and/or in which pilot hood 186 directs the pilot flame in a direction other than towards thermo-electric device 106).

Bottom edge 210 of pilot guard body 184 is configured to engage at least one of retainers 174 of outlet orifice 172, retaining protrusions 150, and locking protrusion 152 to support pilot guard 102 within mounting bracket 108 when pilot burner assembly 100 is assembled. Bottom edge 210 of pilot guard body 184 is also configured to engage at least one of retainers 174 of outlet orifice 172 to restrict axial movement of gas supply line 110. The illustrated embodiment includes three locking fingers 204, although other suitable embodiments may include more or less than three locking fingers, such as one, two, four, five, or any other suitable number of locking fingers that enables pilot burner assembly 100 to function as described herein.

Figure 9:
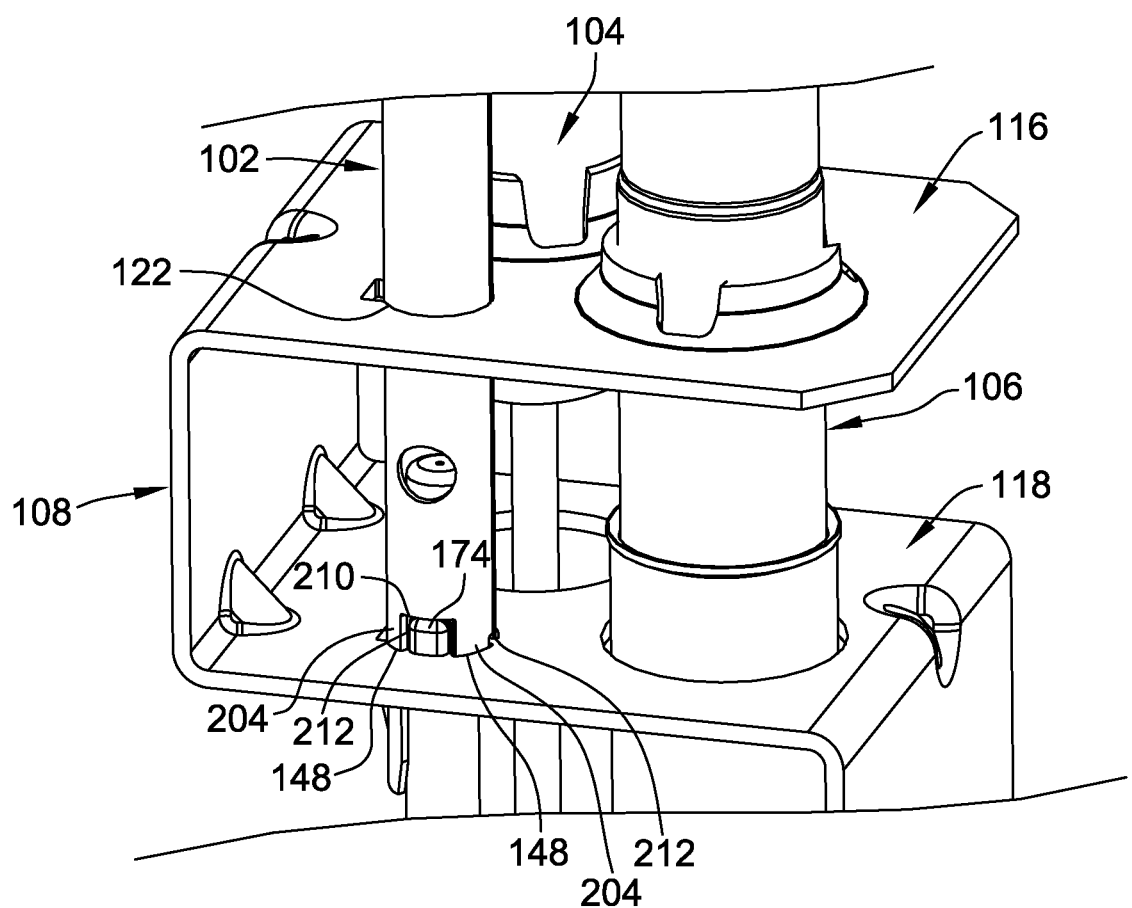
FIG. 9 is another enlarged perspective view of the pilot burner assembly shown in FIG. 2.

With additional reference to FIG. 9, when pilot burner assembly 100 is assembled, locking fingers 204 are positioned within slots 148 defined by retaining protrusions 150 and locking protrusion 152 (both shown in FIG. 4). Locking fingers 204 engage one or more of retaining protrusions 150 and locking protrusion 152 to inhibit rotation of pilot guard 102 and maintain alignment of pilot guard 102 relative to other components of pilot burner assembly 100. More specifically, locking fingers 204 cooperate with pilot guard aperture 128 and one or more of retaining protrusions 150 and locking protrusion 152 to maintain the orientation of pilot guard body 184, pilot hood 186, and sparking tip 194 relative to igniter 104 and thermo-electric device 106. Retainers 174 of outlet orifice 172, retaining protrusions 150, and locking protrusion 152 are each positioned within slots 212 defined by locking fingers 204. Locking fingers 204 engage retainers 174 to inhibit rotation of outlet orifice 172. The configuration of pilot guard 102 and mounting bracket 108 thereby facilitate maintaining the spark gap between sparking tip 194 and igniter 104, and further improve the reliability of pilot burner assembly 100 by maintaining the direction of gas flow discharged from pilot hood 186 towards thermo-electric device 106.

Further, in the example embodiment, retention elements on each of pilot guard 102, mounting bracket 108, and gas supply 110 are configured to cooperate with one another to facilitate mixing of gas and air within pilot guard 102. More specifically, retaining ledge 146 (specifically, retaining protrusions 150, shown in FIG. 4) engages retainers 174 on outlet orifice 172 (shown in FIG. 6) to inhibit axial movement of gas supply line 110 (e.g., away from air inlet 192, shown in FIG. 3), and engages locking fingers 204 to inhibit rotation of pilot guard 102. Further, retention tab 202 engages bracket 108 (specifically, second side 140 of second plate 118, shown in FIG. 4) to inhibit axial movement of pilot guard 102 (e.g., away from outlet orifice 172). The retention elements on pilot guard 102, mounting bracket 108, and gas supply line 110 thus cooperate with one another to maintain a relative position of outlet orifice 172 and air inlet 192. Moreover, in the example embodiment, the retention elements on each of pilot guard 102, mounting bracket 108, and gas supply line 110 cooperate with one another to maintain a relative position between outlet orifice 172 and air inlet 192 such that gas flowing out of outlet orifice 172 and through pilot guard 102 creates a Venturi effect within pilot 102. That is, when pilot burner assembly 100 is assembled, outlet orifice 172 is positioned relative to air inlet 192 such that gas flowing through outlet orifice 172 into fluid conduit 190 causes a reduction in fluid pressure within fluid conduit 190 proximate air inlet 192, thereby facilitating mixing of air and gas within pilot guard 102.

In use, pilot burner assembly 100 is installed in a millivolt controlled, gas fired appliance, such as water heater system 20, to provide an ignition source for a main burner, such as main burner 38. Pilot burner assembly 100 may be installed at the same time as main burner 38, or may be installed at a different time than main burner 38 (e.g., to replace a non-operational pilot burner assembly).

Referring to FIGS. 2-6 and 8-9, to assemble pilot burner assembly 100, thermo-electric device 106 is inserted through thermo-electric device apertures 126, 132, and into resilient contact with retaining ring 158 (shown in FIG. 4). Resilient fingers 160 of retaining ring 158 (shown in FIG. 4) engage thermo-electric device 106, and provide a press-fit connection between thermo-electric device 106 and mounting bracket 108. In the illustrated embodiment, thermo-electric device 106 is inserted into bracket 108 in a first, generally upward direction indicated by arrow 214 in FIG. 3. That is, thermo-electric device 106 is inserted through thermo-electric device aperture 132 first and then thermo-electric device aperture 126. In other suitable embodiments, thermo-electric device 106 may be inserted through thermo-electric device aperture 126 first and then thermo-electric device aperture 132 (i.e., in a direction opposite to first direction 214). Thermo-electric device 106 is connected to controller 44 by connection 42 (both shown in FIG. 1).

Igniter 104 is inserted through igniter apertures 124, 130, and into resilient contact with retaining ring 154 (shown in FIG. 4). Resilient fingers 156 of retaining ring 154 (shown in FIG. 4) engage igniter 104, and provide a press-fit connection between igniter 104 and mounting bracket 108. In the illustrated embodiment, igniter 104 is inserted into bracket 108 in first direction 214. That is, igniter 104 is inserted through igniter aperture 130 first and then igniter aperture 124. In other suitable embodiments, igniter 104 may be inserted through igniter aperture 124 first and then igniter aperture 130 (i.e., in a direction opposite to first direction 214). Igniter 104 is connected to a voltage source (not shown) by connection line 114.

Gas supply line 110 (specifically, outlet orifice 172) is inserted through pilot guard aperture 128 in second plate 118 in first direction 214, and rotated about 45 degrees about longitudinal axis 176 (shown in FIG. 6). More specifically, retainers 174 on outlet orifice 172 are inserted through slots 148 defined by retaining protrusions 150 and locking protrusion 152 (shown in FIG. 4), and outlet orifice 172 is rotated about 45 degrees such that retainers 174 on outlet orifice 172 engage retaining protrusions 150.

Pilot guard 102 is inserted into bracket 108 in a second, generally downward direction indicated by arrow 216 in FIG. 3. Second direction 216 is generally opposite first direction 214.

Pilot guard 102 is inserted through pilot guard apertures 122, 128 such that locking fingers 204 are received within slots 148 defined by retaining protrusions 150 and locking protrusion 152 (shown in FIG. 4). That is, locking fingers 204 are inserted into slots 148 defined by retaining protrusions 150 and locking protrusion 152.

Pilot guard 102 is fluidly connected to gas supply line 110 at first end 178 of pilot guard 102. More specifically, outlet orifice 172 is inserted through gas inlet 180. Retainers 174 on outlet orifice 172 are positioned within slots 212 defined by locking fingers 204 such that rotation of outlet orifice 172 is inhibited by locking fingers 204.

As pilot guard 102 is inserted through pilot guard aperture 128, retention tab 202 is depressed and permits pilot guard 102 to be inserted in second direction 216. Once retention tab 202 has traversed pilot guard aperture 128, retention tab 202 returns to its original, relaxed position, thereby inhibiting axial movement of pilot guard 102 in first direction 214 opposite second direction 216. As best seen in FIG. 8, retention tab 202 is positioned adjacent second side 140 of second plate 118 once pilot guard 102 is fully inserted through pilot guard aperture 128. Retention tab 202 engages second side 140 of second plate 118, and thereby inhibits axial movement of pilot guard 102 in first direction 214.

Bottom edge 210 of pilot guard body 184 is positioned adjacent retainers 174 of outlet orifice 172, retaining protrusions 150, and locking protrusion 152. In the illustrated embodiment, bottom edge 210 engages retainers 174 of outlet orifice 172 and locking protrusion 152 to support pilot guard 102 within mounting bracket 108.

Figure 10:
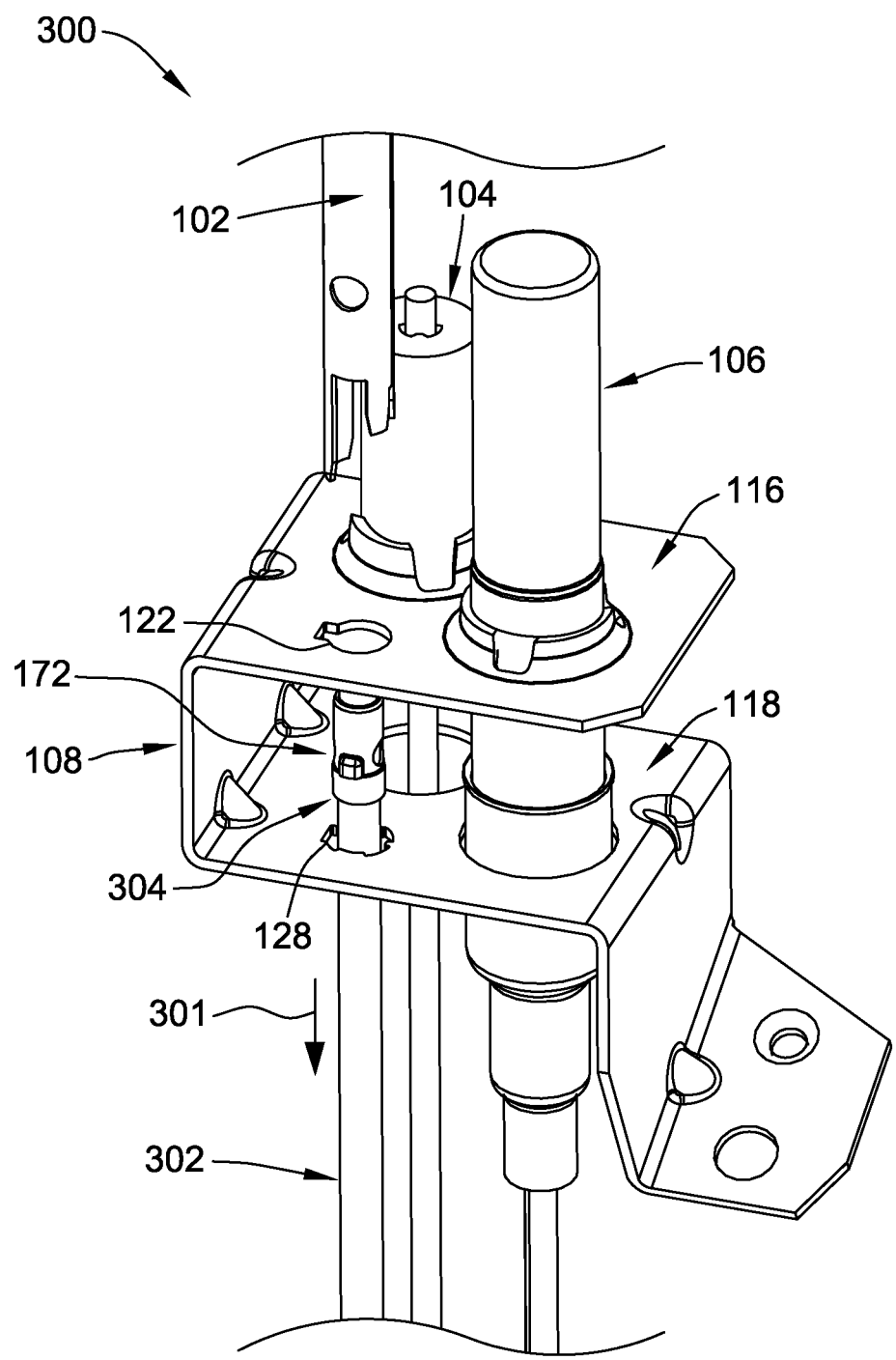
FIG. 10 is a perspective view of another embodiment of a pilot burner assembly suitable for use in the water heater system of FIG. 1.

FIG. 10 is a perspective view of another embodiment of a pilot burner assembly, indicated generally at 300, suitable for use in water heater system 20 (shown in FIG. 1). Components of pilot burner assembly 300 identical to components of pilot burner assembly 100 shown in FIGS. 2-9 are identified using the same reference numerals as used in FIGS. 2-9. As shown in FIG. 10, pilot burner assembly 300 is substantially similar to pilot burner assembly 100 shown in FIGS. 2-9, except pilot burner assembly 300 includes a gas supply line 302 having a retention element 304 configured to maintain a connection between gas supply line 302 and mounting bracket 108. More specifically, retention element 304 is configured to engage retaining ledge 146 (specifically, retaining protrusions 150, shown in FIG. 4)) to restrict axial movement of gas supply line 302 in a first direction, indicated by arrow 301 in FIG. 10. Retention element 304 facilitates reducing the tensile load on outlet orifice 172 because retention element 304, rather than retainers 174 on outlet orifice 172 (shown in FIG. 6), engages retaining ledge 146 when gas supply line 302 is placed under tension. Thus, a tensile load applied to gas supply line 302 is not transferred to outlet orifice 172.

Retention element 304 may include any suitable retention element that enables gas supply line 302 to function as described herein. In the illustrated embodiment, retention element 304 includes a portion of gas supply line 302 having an enlarged dimension (e.g., a protrusion or ridge) relative to the adjacent portions of gas supply line 302. In other suitable embodiments, retention element 304 may include retainers similar to retainers 174 of outlet orifice 172.

Pilot burner assembly 300 is assembled in substantially the same manner as pilot burner assembly 100, except gas supply line 302 is inserted through both first and second pilot guard apertures 122, 128, and is inserted in substantially the opposite direction as gas supply line 110 is inserted. More specifically, gas supply line 302 is inserted through first and second pilot guard apertures 122, 128 in first direction 301, shown in FIG. 10. Retention element 304 is sized to be received through first pilot aperture 122, and to engage retaining ledge 146 (specifically, retaining protrusions 150, shown in FIG. 4) to inhibit axial movement of gas supply line 110 in first direction 301. In the embodiment shown in FIG. 10, outlet orifice 172 is inserted through first pilot guard aperture 122, and retention element 304 prevents outlet orifice 172 from passing through second pilot guard aperture 128 in first direction 301.

As described above, the pilot burner assemblies of the present disclosure utilize various retention elements to provide relatively quick and simple assembly of the pilot burner assemblies. As used herein, the term retention element refers to any feature of the pilot burner assemblies described herein that facilitates connecting, assembling, maintaining a connection, interlocking, or maintaining an orientation of one or more components of the pilot burner assemblies described herein. Retention elements include, for example, retaining ledge 146, slots 148, retaining protrusions 150, locking protrusion 152, retaining ring 154, resilient fingers 156, retaining ring 158, resilient fingers 160, retainers 174, retention tab 202, locking fingers 204, slots 212, and retention element 304.

Embodiments of the systems and methods described herein achieve superior results as compared to prior and systems and methods. For example, unlike known pilot burners, the pilot burner assemblies described herein include various retention elements that facilitate relatively quick and simple assembly as compared to known pilot burners. In particular, the pilot burner assemblies described herein include a mounting bracket having a retaining ledge that cooperates with retention elements on a gas supply line and a pilot guard to maintain a connection between the mounting bracket and the gas supply line. Further, the pilot burner assemblies described herein include a pilot guard having locking fingers that cooperate with retention elements on the mounting bracket and the gas supply line to maintain the connection and orientation of the pilot guard, the gas supply line, and the mounting bracket. Yet even further, the pilot guard includes a depressible retention tab that permits the pilot guard to be inserted in a first direction, and inhibits movement of the pilot guard in the opposite direction, thereby facilitating quick and simple assembly of the pilot burner assembly. Yet even further, the pilot burner assemblies described herein include a pilot hood that includes an angled sparking tip. The angled sparking tip reduces the need to manually adjust the spark gap, improves the reliability of the pilot burner assemblies, and reduces the number of ignition attempts needed to ignite the pilot flame as compared to known pilot burners. Yet even further, the pilot burner assemblies described herein include a thermoelectric device having an internal resistance optimized for maximum power transfer and efficiency with a millivolt controller.

Example embodiments of millivolt controlled gas fired appliances, such as water heater systems, and pilot burner assemblies are described above in detail. The system and assembly are not limited to the specific embodiments described herein, but rather, components of the system and assembly may be used independently and separately from other components described herein. For example, the pilot burner assemblies described herein may be used in gas fired appliances other than water heaters, such as furnaces.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A power generation system for use with a gas fired appliance including a main burner and a gas supply line, the power generation system comprising:
   a pilot burner assembly for igniting gas supplied to the main burner, the pilot burner assembly comprising:
      a thermo-electric device configured to convert thermal energy into electrical energy, the thermo-electric device having an internal resistance; and
      a pilot guard having a first end defining a gas inlet and a second end defining a gas outlet, the pilot guard including an elongate body and a pilot hood disposed at the second end; and
   a controller configured to receive a signal from the thermo-electric device and control the supply of gas to the main burner based on the signal, the controller powered by electrical energy generated by the thermo-electric device, wherein the internal resistance of the thermo-electric device is matched to a load resistance of the controller to facilitate maximum power transfer between the thermo-electric device and the controller.

2. The power generation system of claim 1, wherein the controller has a first load resistance in a first state and second load resistance in a second state, and a power consumption of the controller is greater in the first state than in the second state.

3. The power generation system of claim 2, wherein the internal resistance of the thermo-electric device is substantially equal to the first load resistance.

4. The power generation system of claim 2, wherein the internal resistance of the thermo-electric device is between the first load resistance and the second load resistance.

5. The power generation system of claim 2, wherein the controller includes at least one capacitor that is charged by electrical energy generated by the thermo-electric device, wherein the first state corresponds to a charging state of the controller during which the at least one capacitor is charged, and wherein the second state corresponds to a standby state of the controller.

6. The power generation system of claim 1, wherein the internal resistance of the thermo-electric device is between 2 ohms and 9 ohms.

7. The power generation system of claim 1, wherein the internal resistance of the thermo-electric device is between 4 ohms and 8 ohms.

8. The power generation system of claim 1, wherein the internal resistance of the thermo-electric device is between 4.5 ohms and 5.5 ohms.

9. The power generation system of claim 1, wherein the pilot burner assembly further includes a bracket comprising a first plate and a second plate spaced from the first plate, each of the first and second plates having a pilot guard aperture defined therein, the pilot guard configured to be inserted into the pilot guard apertures, and wherein the pilot guard further includes a first retention element that cooperatively engages a second retention element on the gas supply line to maintain a connection between the pilot guard and the gas supply line.

10. The power generation system of claim 9, wherein the first retention element comprises a plurality of locking fingers extending from a bottom edge of the pilot guard body, the locking fingers defining slots configured to receive the second retention element therein.

11. The power generation system of claim 9, wherein the bracket further comprises a third retention element that cooperatively engages at least one of the first retention element and the second retention element to maintain the connection between the pilot guard and the gas supply line.

12. The power generation system of claim 11, wherein the gas supply line further includes an outlet orifice and the pilot guard further includes at least one air inlet, separate from the gas inlet, for receiving ambient air therethrough, and wherein the third retention element cooperatively engages at least one of the first retention element and the second retention element to maintain a relative position between the outlet orifice and the at least one air inlet such that gas flowing through the pilot guard creates a Venturi effect within the pilot guard to facilitate mixing of gas and air within the pilot guard.

13. The power generation system of claim 11, further comprising the gas supply line, wherein the gas supply line comprises an outlet orifice positioned within the first end of the pilot guard, the second retention element comprising a retainer extending radially outward from the outlet orifice, the retainer engaging the third retention element to maintain a connection between the gas supply line and the bracket.

14. The pilot burner assembly of claim 9, wherein the pilot guard further comprises a depressible retention tab, the retention tab configured to permit the pilot guard to be inserted into the bracket in a first direction, and inhibit movement of the pilot guard in a second direction opposite the first direction.

15. The pilot burner assembly of claim 9 further comprising an igniter configured to be connected to the bracket, wherein the pilot hood comprises an angled sparking tip configured to concentrate an electric field induced by the igniter within the pilot hood at the sparking tip.

* * * * *